United States Patent [19]

Miller

[11] Patent Number: 4,815,224
[45] Date of Patent: Mar. 28, 1989

[54] ELECTRIC IRON

[75] Inventor: Henry O. Miller, Hinsdale, Ill.

[73] Assignee: Sears, Roebuck & Company, Chicago, Ill.

[21] Appl. No.: 88,518

[22] Filed: Aug. 20, 1987

Related U.S. Application Data

[63] Continuation of Ser. No. 863,729, May 16, 1986, abandoned.

[51] Int. Cl.⁴ .............................................. D06F 75/16
[52] U.S. Cl. ........................................... 38/90; 38/88; 38/77.8
[58] Field of Search ............... 219/245, 254, 255, 256, 219/258; 38/90, 88, 77.8

[56] References Cited

U.S. PATENT DOCUMENTS

| | | | |
|---|---|---|---|
| 1,484,452 | 2/1924 | Shoenberg | 219/254 |
| 1,535,592 | 4/1925 | Forshee | 38/90 |
| 1,678,310 | 7/1928 | Woodruff | 219/256 |
| 2,048,184 | 7/1936 | Dormeyer | 366/344 X |
| 2,116,928 | 5/1938 | Hanneman | 16/114 R X |
| 2,249,620 | 7/1941 | Samuels | 219/245 |
| 2,931,632 | 4/1960 | DeAngelis et al. | 366/129 |
| 4,366,367 | 12/1982 | Mazzucco | 219/245 X |
| 4,549,811 | 10/1985 | Schiffner et al. | 366/129 |
| 4,571,862 | 2/1986 | Costa | 219/255 |

FOREIGN PATENT DOCUMENTS

| | | | |
|---|---|---|---|
| 523196 | 8/1923 | France | 38/90 |
| 949493 | 8/1949 | France | 219/255 |
| 166000 | 8/1985 | Japan | 219/258 |
| 44377 | 5/1961 | Poland | 219/245 |

OTHER PUBLICATIONS

Pages 1164 and 1165 of Sears, Roebuck and Co. 1985 Fall Winter Catalog.

Primary Examiner—Nicholas P. Godici
Assistant Examiner—Carmine Cuda
Attorney, Agent, or Firm—Wood, Dalton, Phillips, Mason & Rowe

[57] ABSTRACT

A handle for an appliance adapted to be held by a hand and moved by a forearm when the appliance is being used. The handle includes a gripping portion adapted to be gripped by the hand of a user and adapted to be connected to a body portion of the appliance disaposed generally below the gripping portion in spaced relation thereto with the appliance being of the type where the body portion is adapted for movement in a generally horizontal plane when the gripping portion is moved by the forearm of the user. With this arrangement, the gripping portion is disposed at an angle of between approximately 25° and 45° to the generally horizontal plane of movement.

1 Claim, 2 Drawing Sheets

ELECTRIC IRON

This application is a continuation of application Ser. No. 863,729, filed May 16, 1986 now abandoned.

FIELD OF THE INVENTION

The present invention relates to small household appliances and, more particularly, to an appliance handle for reducing the degree of muscular exertion.

BACKGROUND OF THE INVENTION

Generally, small household appliances are thought to be relatively effort free. This is a misconception probably due to the fact that many household appliances such as electric mixers and electric steam irons have greatly reduced the amount of effort required to perform tasks such as mixing or beating food products and ironing clothing as a result of the significant advances over early hand mixers and heavy, solid flatirons. Nevertheless, the fact remains that certain repetitive household tasks require significant muscular effort.

For instance, ironing is a repetitive, time-consuming activity which is known to result in a strain on the deltoid muscle. This occurs because ironing commonly requires the upper arm to be held in a position away from the side of the body. Since this position can be maintained only by utilizing the deltoid muscle, this large triangular muscle in the shoulder region is placed under considerable strain.

Similarly, the use of a conventional mixer places a strain on the deltoid muscle in much the same manner as the iron. The mixer, as with the iron, conventionally utilizes a generally horizontal back and forth motion in which the deltoid muscle is placed under a strain due to the fact that the upper arm is elevated. Moreover, this phenomenon is consistent with reference findings (see, e.g., Basmajian and Deluca, Muscles Alive, Their Functions Revealed By Electromyography, Page 269).

Moreover, in the case of both ironing and mixing, the act of heeling the iron or mixer, i.e., positioning the iron or mixer in a nearly vertical position on the heel when not in use, requires a strenuous movement. It is also the case with both irons and electric mixers that the shape of the small appliance combined with the position of the work surface relative to the eyes of the user result in relatively poor visibility of the work area. Additionally, while the discussion has been focused upon irons and mixers, it will be appreciated that the problem of muscular exertion and/or strain is known to exist with other small appliances, as well.

With regard to the problem of muscular exertion in the use of small appliances such as those found in the home, it is important to note that such appliances are normally designed to require a minimum of effort. Specifically, in the case of both electric irons and electric mixers, as with other small appliances that are otherwise thought to be relatively effort free, the appliance itself is designed to do most of the work. Normally, it is thought necessary to provide only a slight amount of movement of the appliance by the user and certainly with only a small amount of muscular exertion since there is no significant "force" to be applied by the user against the object being worked on by the electric iron or the electric mixer, i.e., clothing or food products, but the inherent limitations in the design of existing electric irons and electric mixers have nevertheless dictated undesirable levels of muscular exertion. Moreover, where the specific work activity, e.g., ironing or mixing, is continued for a considerable period of time, it is well recognized that such activity will result in a strain to the deltoid muscle due to the normal position of the upper arm away from the side of the body. Thus, while small appliances have failed to achieve sufficiently low levels of muscular exertion, they are nevertheless recognized as distinct from power tools and other devices that knowingly require the application of considerable force during operation.

The present invention is directed to overcoming the above stated problems and accomplishing the stated objects by providing a unique appliance handle.

SUMMARY OF THE INVENTION

Accordingly, the present invention is directed to a handle for an appliance adapted to be held by a hand and moved by a forearm when the appliance is being used. The handle includes a gripping portion adapted to be gripped by the hand of a user together with means adapted to connect the gripping portion of the handle to a body portion of the appliance. Regardless of the appliance upon which the handle is being used, the body portion of the appliance is of a type disposed generally below the gripping portion of the handle in spaced relation thereto when the gripping portion is held by the hand of the user and the body portion is adapted for movement in a generally horizontal plane when the gripping portion is moved by the forearm of the user. The handle also includes the gripping portion being disposed at an angle of between approximately 25° and 45° to the generally horizontal plane during movement of the body portion of the appliance. With this arrangement, the handle is adapted to significantly reduce the muscular effort of the user of the appliance.

More specifically, the appliance is of a type that has a working portion associated with the bottom of the body portion in spaced relation to the gripping portion of the handle. For example, the appliance can suitably be an electric iron in which case the body portion is an iron casing and the working portion is an iron base plate, or the appliance can be an electric mixer in which case the body portion is a motor housing and the working portion is a pair of beaters. In either case, the gripping portion connecting means preferably includes an integral rear extension joining the gripping portion of the handle to a rear portion of the iron casing or a rear portion of the motor housing, respectively.

When the appliance is an electric iron, the gripping portion connecting means also preferably includes a water reservoir integral with the iron casing It will be appreciated that the water reservoir will join the gripping portion of the handle to a front portion of the iron casing Moreover, the water reservoir preferably slopes upwardly and rearwardly from the iron casing to the gripping portion of the handle to enhance visibility of items being ironed.

In the case of an electric mixer, the gripping portion connecting means preferably includes an integral front extension of the gripping portion of the handle. It will be appreciated that the integral front extension will join the gripping portion of the handle to a front portion of the motor housing. Furthermore, the integral front extension preferably slopes upwardly and rearwardly from the motor housing to the gripping portion of the handle to enhance visibility of food products being mixed Other objects, advantages and features of the present invention will become apparent from a consideration of the following specification taken in conjunction with the accompanying drawings.

DETAILED DESCRIPTION OF THE PREFERRED EMBODIMENTS

Figure 1:
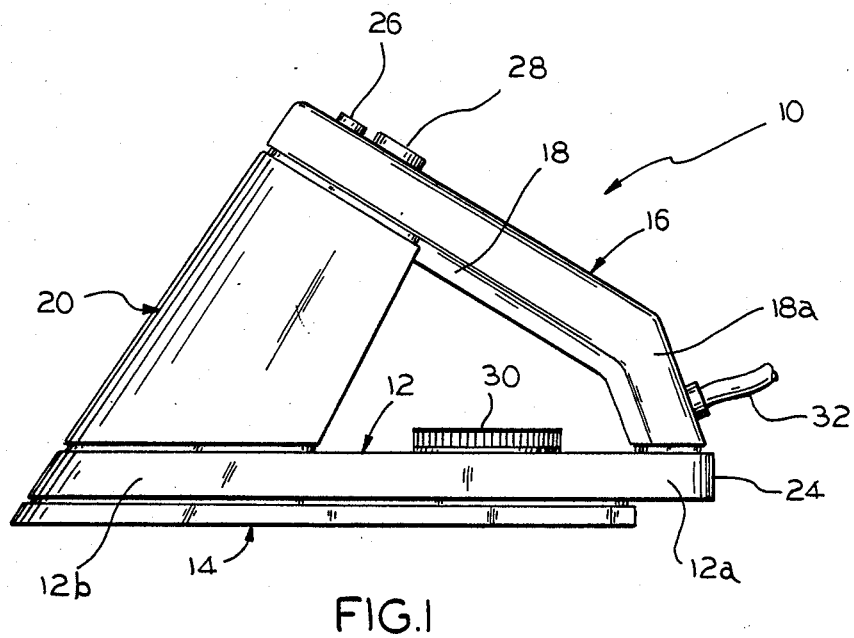
FIG. 1 is a side elevational view of a handle for an appliance such as an electric iron in accordance with the present invention.

Referring to FIG. 1, an electric iron 10 is adapted to be held by a hand and moved by a forearm during use thereof. The electric iron 10 has a body portion 12 in the form of an iron casing and a working portion 14 in the form of an iron base plate associated with the bottom of the iron casing 12. Additionally, the electric iron 10 includes a handle 16 having a gripping portion 18 adapted to be gripped by the hand during use thereof.

Still referring to FIG. 1, the electric iron 10 includes means adapted to connect the gripping portion 18 of the handle 16 to the iron casing 12. This is done in such a manner that the gripping portion 18 of the handle 16 is disposed above the iron casing 12 to accommodate the gripping portion 18 being held by the hand of the user. As will also be appreciated, the iron casing 12 is adapted for movement in a generally horizontal plane when the gripping portion 18 is moved by the forearm of the user.

As shown, the gripping portion connecting means includes an integral rear extension 18a of the gripping portion 18 joining the gripping portion 18 of the handle 16 to a rear portion 12a of the iron casing 12. The gripping portion connecting means also includes a water reservoir 20 integral with the iron casing 12 joining the gripping portion 18 of the handle 16 to a front portion 12b of the iron casing 12. In accordance with the invention, the gripping portion 18 of the handle 16 is disposed at an angle of between approximately 25° and 45° to a generally horizontal plane during movement of the electric iron 10.

In the embodiment illustrated in FIG. 1, the water reservoir 20 slopes upwardly and rearwardly from the iron casing 12 to the gripping portion 18 of the handle 16 to give excellent visibility of clothing or other items being ironed. In addition, by providing the gripping portion 18 of the handle 16 at an angle of between approximately 25° and 45°, the user can adjust the ironing board upward to a level further enhancing visibility.

Of course, the upward adjustment of the ironing board is rendered possible by the angle of the gripping portion of the handle. This permits the user to iron comfortably with the upper arm relaxed and next to the side of the body with the normal back and forth ironing motion being provided almost entirely by the forearm In contrast, conventional irons with nearly horizontal handles would require upper arm elevation with resulting deltoid muscle strain.

Figure 3:
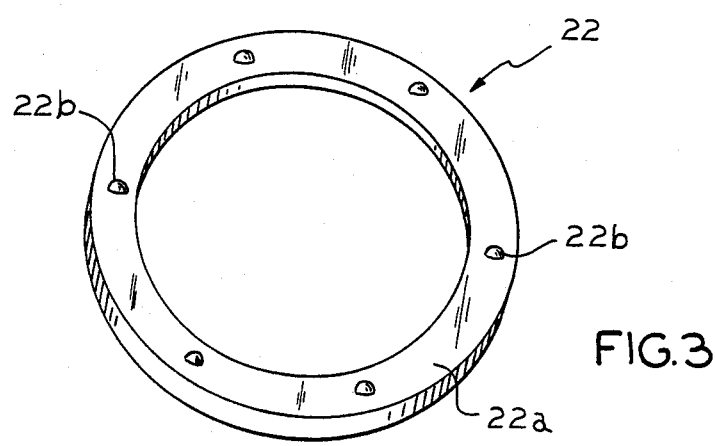
FIG. 3 is a perspective view of a trivet for the electric iron illustrated in FIG. 1.

With the embodiment illustrated in FIG. 1, the electric iron 10 is particularly well adapted for placement on a trivet 22 (see FIG. 3). The trivet 22 is preferably circular in shape and eliminates the need of positioning the iron 10 on its heel 24 in a nearly vertical position when not ironing, as with conventional irons, thereby eliminating the strenuous movement normally needed to heel an iron. By making the trivet circular in shape, the iron 10 may simply be positioned on the trivet in a horizontal position in any angular orientation.

While not critical to the invention, the trivet 22 can be formed in an inexpensive fashion from multiple materials. For instance, the body 22a of the trivet 22 can be formed of an inexpensive phenolic plastic ring through which are placed silicone rubber projections 22b. Still other possibilities include a large trivet for iron storage on a wall and a complex trivet with electrical contacts for a cordless iron.

Referring once again to FIG. 1, the electric iron 10 can be conventional in other respects. For instance, it can have standard control buttons 26 and 28 for steam and spray mist functions and can have an easy access dial 30 for temperature and fabric settings. In addition, the electric iron 10 can have a directional cord 32 with integral strain relief in conventional fashion.

While not shown, it will also be appreciated that the electric iron 10 can be provided with a trigger switch on the underside of the gripping portion 18 of the handle 16 to shut off the steam function when the iron is on the trivet 22. Moreover, it will further be appreciated that, with the water reservoir 20 at the front of the electric iron 10, a water gauge can be placed on the front and still other features of conventional irons can also be successfully utilized.

Figure 4:
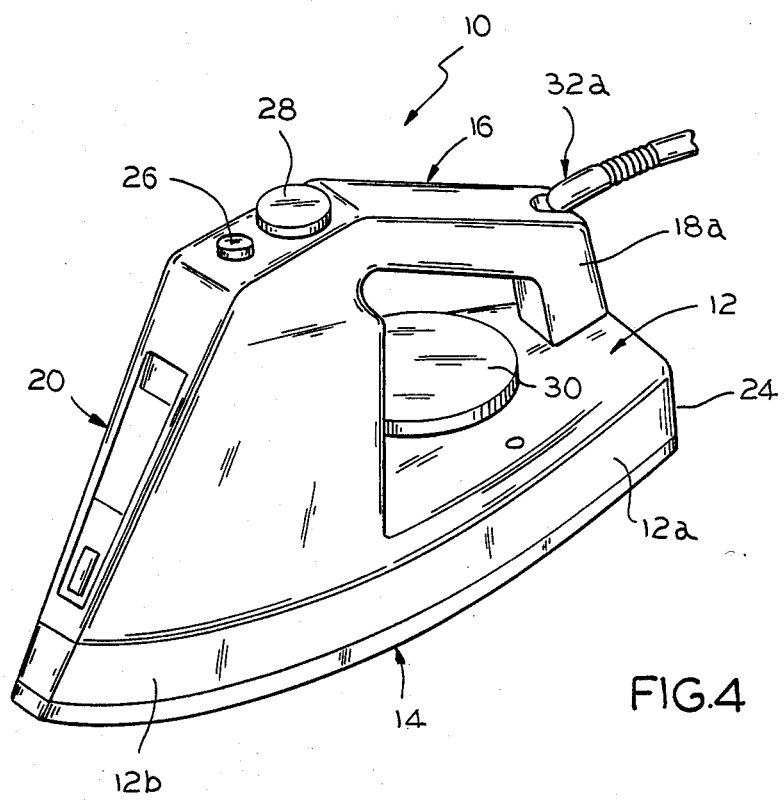
FIG. 4 is a perspective view of a modified electric iron in accordance with the present invention.

Referring to FIG. 4, a modification of the electric iron 10 which incorporates a conventional pivoting cord mechanism 32a is illustrated. The pivoting cord mechanism 32a is provided at the juncture between the gripping portion 18 of the handle 16 and the integral rear extension 18a thereof. As will be appreciated, the pivoting cord mechanism 32a makes it possible to heel the iron 10 should it be desired as an alternative to using the trivet 22.

With a handle angle of between approximately 25° and 45°, the electric iron 10 requires about one-half the deltoid muscular effort of a conventional iron, i.e., an iron with a handle angle of about 10°. This has been measured under laboratory conditions using an Autogen HT-1 electromyograph with three self-stick electrodes attached to the exterior of the right deltoid muscle. With the surface of an ironing board adjusted to a height of 36 inches, a 5 foot 7 inch user moved an iron having a handle at an angle of 27° with a back and forth 10 inch stroke in the center of the board during measurement of the muscular effort.

Similarly, use of a trivet also reduces the deltoid muscular effort by about one-half compared to the deltoid muscular effort in heeling a conventional iron. This, too, has been measured under laboratory conditions using an Autogen HT-1 electromyograph with the user first moving a conventional iron from an ironing position to a heel rest position and next moving an iron in accordance with the invention having a handle at an angle of 27° from an ironing position to a round trivet 4 and ⅝ inches in diameter and ¾ inches high. In addition to the reduction in muscular effort, the round trivet also allows the user to place the iron on the trivet without any inconvenient angular iron reorientation.

Figure 2:
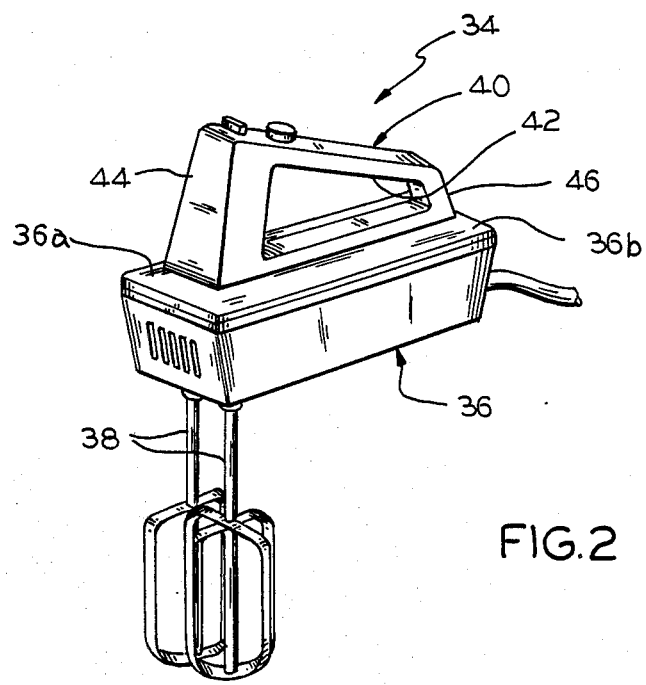
FIG. 2 is a perspective view of a handle for an appliance such as an electric mixer in accordance with the present invention.

Referring to FIG. 2, an electric mixer 34 is also adapted to be held by a hand and moved by a forearm during use thereof. The electric mixer 34 includes a body portion 36 in the form of a motor housing and a working portion 38 in the form of a pair of beaters associated with the bottom of the motor housing 36. Moreover, the electric mixer 34 includes a handle 40 having a gripping portion 42 adapted to be gripped by the hand during use thereof.

Still referring to FIG. 2, means are provided for connecting the gripping portion 42 of the handle 40 to the motor housing 36. It will be appreciated that the gripping portion 42 of the handle 40 is disposed above the motor housing 36 in spaced relation thereto when the gripping portion 42 is held by the hand of a user, and the motor housing 36 is adapted for movement in a generally horizontal plane when the gripping portion 42 of the handle 40 is moved by the forearm of the user. Additionally, the gripping portion 42 of the handle 40 is disposed at an angle of between approximately 25° and 45° to the generally horizontal plane during movement of the electric mixer 34.

As shown, the gripping portion connecting means includes an integral front extension 44 of the handle 40 joining the gripping portion 42 to a front portion 36a of the motor housing 36. Preferably, the integral front extension 44 slopes upwardly and rearwardly from the front portion 36a of the motor housing 36 to the gripping portion 42 of the handle 40 so as to enhance visibility during use of the mixer 34. Further, the gripping portion connecting means also includes an integral rear extension 46 of the handle 40 joining the gripping portion 42 to a rear portion 36b of the motor housing 36.

While the invention has been described in conjunction with an electric iron and an electric mixer, it will be appreciated by those skilled in the art that it is equally applicable to any appliance that includes a handle. The handle is well suited for any appliance adapted to be held by a hand and moved by a forearm when the appliance is being used with normal movement in a generally horizontal plane. For any appliance, the handle is provided with a gripping portion disposed at an angle of between approximately 25° and 45° to the generally horizontal plane of movement.

While in the foregoing specification a detailed description of the preferred embodiments has been set forth, it will be appreciated by those skilled in the art that the details herein given may be varied without departing from the spirit and scope of the appended claims.

I claim:

1. An electric iron adapted to be held by a hand and moved by a forearm during use thereof, comprising:

a body portion including an iron casing and a working portion including an iron base plate, the iron base plate of the working portion being associated with the bottom of the iron casing of the body portion;

a handle including a gripping portion adapted to be gripped by the hand of a user;

means adapted to connect the gripping portion of the handle to the top of the iron casing, the gripping portion of the handle being disposed above the casing in spaced relation thereto when the gripping portion is held by the hand of the user, the iron base plate being adapted for movement in a generally horizontal plane when the gripping portion of the handle is moved by the forearm of the user;

the gripping portion connecting means including a fixed integral rear extension of the gripping portion of the handle joining the gripping portion of the handle to a rear portion of the iron casing, the gripping portion connecting means also including a fixed integral water reservoir having forward and rearward walls both sloping upwardly and rearwardly from a front portion of the iron casing to join the handle, the point at which said rearward wall joins the handle defining the forwardmost end of the gripping portion;

the water reservoir being disposed entirely above the iron casing and entirely forwardly of the gripping portion of the handle;

the gripping portion of the handle being maintained in a fixed portion by and extending between the rear extension and the water reservoir so as to be disposed at an angle of between 25° and 45° to the generally horizontal plane during movement of the iron casing.

* * * * *